United States Patent

[11] 3,629,704

| [72] | Inventor | Carlile R. Stevens<br>1000 Ironwood Place, Alamo, Calif. 94507 |
| --- | --- | --- |
| [21] | Appl. No. | 685,456 |
| [22] | Filed | Nov. 24, 1967 |
| [45] | Patented | Dec. 21, 1971 |

[54] AUTOMOTIVE ELECTRICAL SYSTEM TEST APPARATUS
11 Claims, 6 Drawing Figs.

[52] U.S. Cl.................................................324/158 MG,
324/77 A, 324/102
[51] Int. Cl........................................................G01r 31/00,
G01r 19/16
[50] Field of Search.............................................324/158
MG, 102, 119, 77, 57, 34, 51, 15

[56] References Cited
UNITED STATES PATENTS

| 2,914,726 | 11/1959 | Harmon | 324/37 |
| --- | --- | --- | --- |
| 3,346,725 | 10/1967 | Allured | 324/70 X |
| 2,924,773 | 2/1960 | Lykke | 324/51 |
| 3,142,797 | 7/1964 | Grant | 324/73 |
| 3,409,824 | 11/1968 | Makuh | 324/15 |

*Primary Examiner*—Rudolph V. Rolinec
*Assistant Examiner*—Ernest F. Karlsen
*Attorney*—Roger A. Marrs

ABSTRACT: An automobile alternator and voltage regulator test apparatus which may be connected to the electrical system of a car without altering the existing wiring. The test apparatus analyzes the waveform and magnitude of the ripple voltage superimposed on the alternator output, and also senses the voltage level present at the field terminal of the alternator. In response to the detected ripple characteristics and measured field voltage, the device provides an unambiguous visual indication of which components, if any, are malfunctioning.

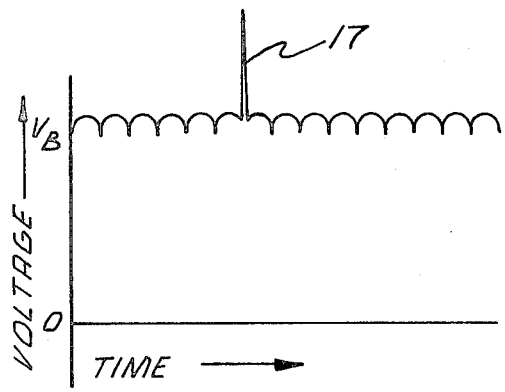
Fig_1
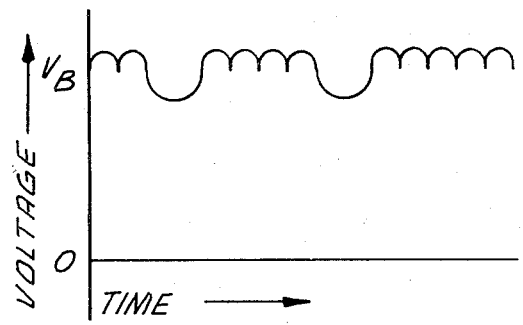
Fig_2
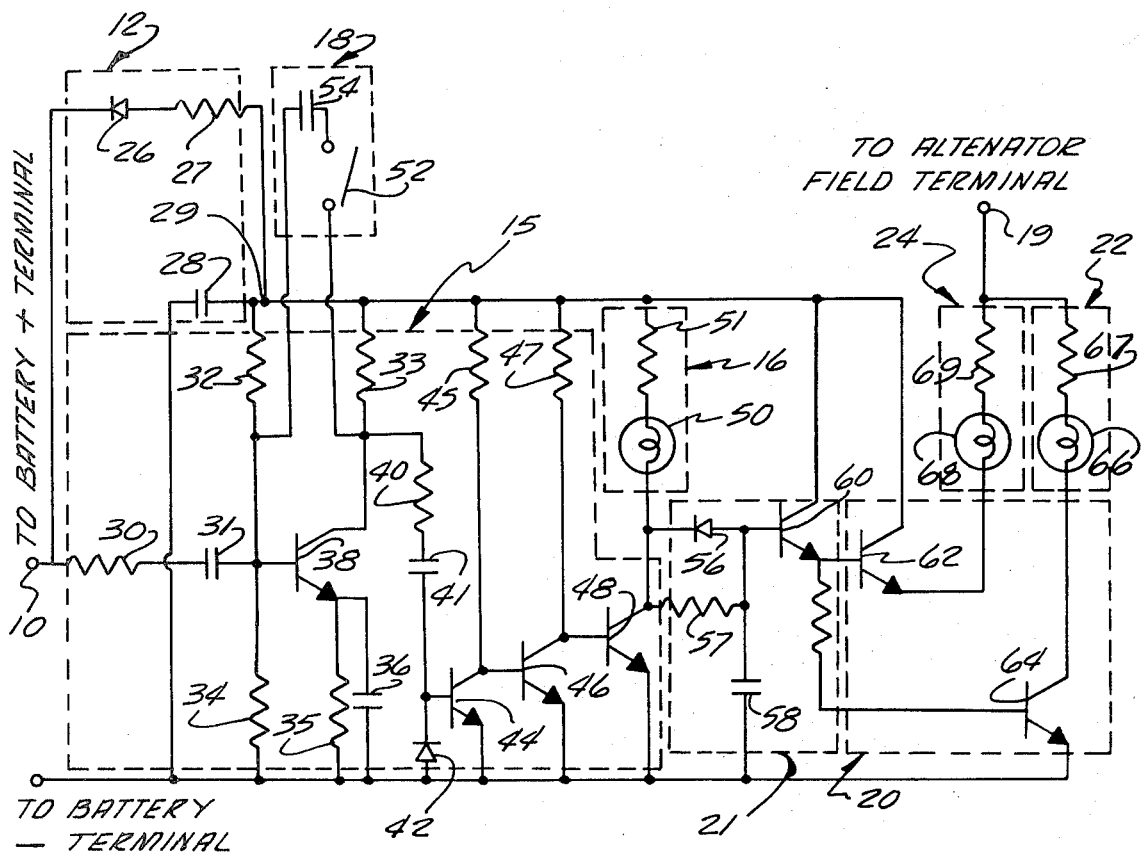
Fig_4
INVENTOR
CARLILE R. STEVENS
BY Roger A. Marro INVENTOR
CARLILE R. STEVENS
BY
Roger G. Marrs

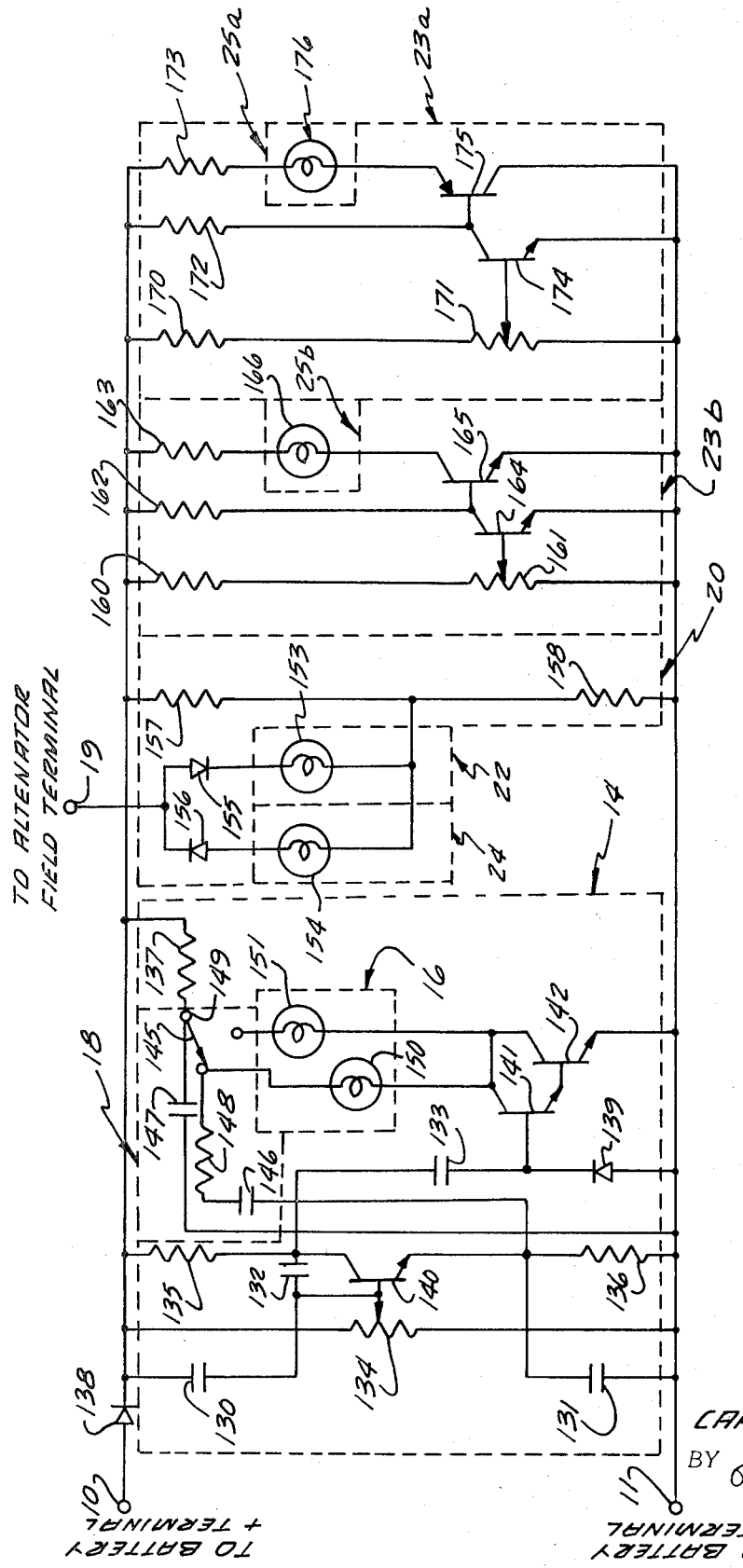

AUTOMOTIVE ELECTRICAL SYSTEM TEST APPARATUS

BACKGROUND OF THE INVENTION

1. Field of the Invention

This invention relates to an alternator test apparatus and, more particularly, to a device for detecting the malfunctioning of an automotive alternator by analyzing the waveshape and magnitude of the ripple voltages superimposed on the alternator output.

2. Description of the Prior Art

In the United States, all new vehicles and many older models are equipped with alternators instead of generators for charging the vehicle's battery and for operating the vehicle electrical system. The primary difference between an alternator and a generator is that the alternator produces alternating current (AC), while the generator produces direct current (DC). Since the vehicle electrical system principally utilizes DC components, the AC produced by the alternator is converted to DC by diode rectifiers within the alternator housing. This makes the output of the alternator equivalent to that of the generator.

The sudden change from the use of generators to the use of alternators has left most mechanics and service station personnel in a quandary as to how to service the alternators. The mechanisms now in general use for alternator testing purposes include voltage or current meters which are connected into the vehicle electrical circuit at various points. By comparing the measured voltage and current with the values expected during normal operation, a determination can be made of which components are malfunctioning.

These prior art devices are difficult to connect, some requiring actual interruption of the existing vehicle wiring. These mechanisms, moreover, require relatively skilled and experienced operators to correlate correctly the various voltage and current readings and to determine from these readings whether the alternator, the alternator rectifier diodes, or the voltage regulator, is defective.

Moreover, most prior art automotive electrical system test devices require an external source of power; that is, they are not powered by the system under test. Such devices are inconvenient, in that they must be plugged into a power source and hence are of limited usefulness for roadside service.

These limitations of the prior art are overcome by providing a test apparatus which may be connected into the automobile electrical system without breaking or altering any of the existing wiring. In accordance with the present invention, the test apparatus analyzes the waveform and magnitude of the ripple voltage superimposed on the alternator output, which ripple characteristics are indicative of whether or not the alternator is operating normally. Circuitry is provided to energize indicator lights in response to certain detected ripple characteristics, thereby providing an unambiguous indication of the operation status of the alternator. In addition, by sensing the voltage present at the alternator field terminal, malfunctioning of the voltage regulator may be detected.

SUMMARY OF THE INVENTION

The inventive alternator and voltage regulator test apparatus includes a ripple detector which initially is connected to the battery terminals of the automotive electrical system under test. If the alternator and voltage regulator both are performing properly, a small ripple voltage will be present at the battery terminals. Ripple detector circuitry responsive to this normal ripple voltage and waveform will cause a first indicator in the tester to go ON, indicating that both the alternator and voltage regulator are functioning properly. If this is the case, the test is complete.

If either the alternator or regulator are not functioning properly, the first indicator will remain OFF. In this case, a wire is connected to the field terminal of the alternator. Circuitry in the tester senses the voltage level present at the field terminal and provides outputs to indicators which designate the malfunctioning components. In particular, if the alternator is operating but the voltage regulator is defective, no voltage will appear at the field terminal, and a second indicator will designate that the regulator is faulty. If the regulator is operating normally, but the alternator is not, a voltage will be present at the field, and a third indicator will show that the problem is in the alternator.

By closing a switch (which may be of the pushbutton variety) on the tester, the operator can initiate a test of the diodes in the alternator. Should one or more diodes be open or short circuited, the resultant ripple voltage will have characteristics significantly different from the ripple present during normal alternator operation. Closing the test switch causes response control means to alter the ripple detector in such a manner as to be sensitive only to the ripple waveform associated with a faulty diode. Detection of such a ripple causes an indicator in the test apparatus to register, indicating that one or more alternator diodes are defective.

In another embodiment of the invention, circuitry response to the voltage level at the battery terminals causes indicator lights to show whether the voltage regulator is correctly adjusted, or that it is adjusted to provide too high or too low a charging voltage to the battery.

Accordingly, it is an object of this invention to provide an apparatus for detecting the ripple characteristics of an alternator output.

It is another object of this invention to provide an alternator test apparatus which analyzes the magnitude and waveform of the ripple voltage superimposed on the output of an alternator and which provides in response thereto an indication of the operational status of the alternator.

Another object of this invention is to provide a test apparatus which detects the malfunctioning of an automotive alternator and voltage regulator by sensing the alternator ripple characteristics and the alternator field terminal voltage.

Yet another object of this invention is to provide a test apparatus for automobile alternators and voltage regulators which is unambiguous in its indication and which may be connected without disconnecting or altering any of the existing automobile electrical wiring.

It is yet another object of this invention to provide an alternator tester which is powered by the automobile electrical system under test.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 shows a typical waveform of the ripple voltage superimposed on an automobile alternator output during normal operation of the alternator and voltage regulator;

FIG. 2 shows a typical waveform which may occur when one or more of the alternator diodes becomes open or short circuited;

FIG. 4 is an electrical schematic diagram of one embodiment of the inventive alternator and voltage regulator tester shown in block diagram form in FIG. 3;

FIG. 6 is an electrical schematic diagram of yet another embodiment of the inventive alternator ripple analysis test apparatus, further including charging voltage level sensing circuitry and indicators to show proper or improper adjustment of the voltage regulator.

DESCRIPTION OF THE PREFERRED EMBODIMENT

An automotive alternator produces alternating current which is rectified to DC by diodes contained in the alternator housing; the output of such an alternator appears as a pulsating direct current. Although this pulsation is heavily filtered by the car battery, during normal alternator operation, a small AC ripple remains superimposed on the DC alternator output. The waveshape of a typical ripple voltage present during such normal alternator operation is shown in FIG. 1. Note in FIG. 1 that the voltage $V_B$ is the nominal DC alternator voltage (commonly about 13 volts) and is slightly higher than the nominal car battery voltage (commonly 12 volts). The amplitude of the normal ripple voltage itself typically is in the order of a few millivolts (and is slightly exaggerated in FIG. 1). Extensive tests have shown that the magnitude of the normal ripple is indicative of the amount of current being supplied by the alternator.

Should one or more of the diodes in the alternator be open or short circuited, the waveform and magnitude of the ripple will be altered substantially. Typically, the ripple voltage indicative of a defective alternator diode has the appearance of the waveshape shown in FIG. 2.

Figure 3:
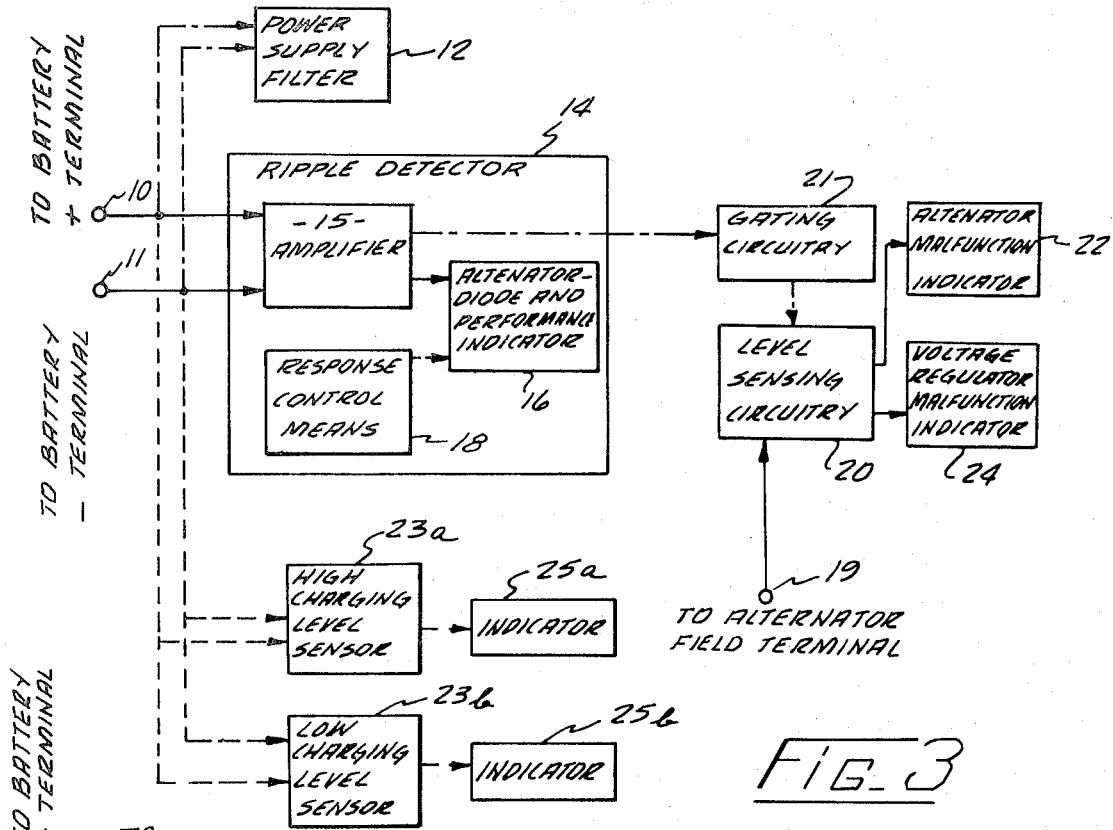
FIG. 3 is a simplified block diagram of the inventive automobile alternator and voltage regulator test apparatus; the device detects, and is responsive to, alternator ripple waveforms such as those illustrated in FIGS. 1 and 2.

Referring now to FIG. 3, there is shown a simplified block diagram of the automobile alternator and voltage generator test apparatus in accordance with the present invention. As indicated in FIG. 3, test leads 10 and 11 may be connected by the operator respectively to the positive (+) and negative (−) terminals of the automobile battery. Wires 10 and 11 may be provided with clips to facilitate making these connections. The DC voltage from the battery is used to power various circuits of the test apparatus; this voltage may be filtered by power supply filter 12 to remove any ripple which may be present. (For simplicity, the power connections between filter 12 and the various other circuits of the test apparatus are not shown in FIG. 3).

If the alternator and voltage regulator both are functioning normally, the alternator output will be present across the battery terminals. This alternator output will contain both the DC component (used for charging the battery) and the normal superimposed ripple depicted typically in FIG. 1. This ripple is sensed by ripple detector 14, which detector is described in detail hereinbelow in conjunction with FIGS. 4, 5 and 6.

Ripple detector 14 comprises amplifier 15 which is capacitively coupled to the battery terminals via leads 10 and 11. When a ripple waveform associated with normal alternator operation is detected, amplifier 15 provides an output to alternator/diode performance indicator 16. Indicator 16 may comprise a lamp which goes ON when an output is obtained from amplifier 15; alternatively, indicator 16 may comprise other devices, such as a meter, well known to those skilled in the art. In any event, indicator 16 goes ON when both the alternator and the voltage regulator are functioning properly.

Should alternator/diode performance indicator 16 remain OFF, indicating that either the alternator or the voltage regulator is not functioning properly, the operator proceeds to connect lead 19 to the field terminal of the alternator under test. Lead 19, which may be provided with a clip to facilitate connection to the alternator, thus provides an input to field terminal voltage level-sensing circuitry 20. In one embodiment, gating circuitry 21 is provided which receives a second input from ripple detector 14 in such a manner that level-sensing circuitry 20 will be energized only when a ripple waveform associated with normal alternator operation has not been detected.

If the voltage present at the alternator field terminal is at a positive potential with respect to the battery negative terminal, the fault lies in the alternator, and level-sensing circuitry 20 provides an output causing alternator malfunction indicator 22 to indicate this condition. If the alternator field terminal is at the same potential as the battery negative terminal, the trouble lies in the voltage regulator, and level-sensing circuitry 20 provides an output to voltage regulator malfunction indicator 24 to indicate this condition.

To test for open or short-circuited alternator diodes, the operator closes a switch on the tester which is associated with response control means 18. Response control means 18, the operation of which is described in detail hereinbelow in conjunction with FIGS. 4, 5 and 6, alters the characteristics of amplifier 15 in such a manner that the detector is responsive only to the ripple waveform associated with faulty diodes. Should such a waveform (see FIG. 2) be detected, amplifier 15 will provide an output to indicator 16. Thus, with the switch closed, indicator 16 will go ON if one or more alternator diodes are open or short circuited.

In a third embodiment (see FIG. 6), the voltage level at the vehicle battery terminals is sensed by high and low charging level sensors 23a and 23b. Sensor 23a provides an output to its associated indicator 25a when the voltage level at the battery terminals is greater than required for normal charging. Similarly, sensor 23b causes its associated indicator 25b to go ON when the battery is being charged to too low a level. Since the voltage level at the battery is indicative of adjustment of the voltage regulator, indicators 25a and 25b inform the serviceman that the regulator requires appropriate adjustment.

Referring now to FIG. 4, there is shown a schematic diagram of one embodiment of the inventive automobile alternator and voltage regulator test apparatus. As shown in FIG. 4, leads 10 and 11 may be connected respectively to the positive (+) and negative (−) terminals of the automobile battery. Diode 26, resistor 27 and capacitor 28 comprise power supply filter 12 and supply (at junction 29) filtered voltage to power the tester. Diode 26 also acts to protect the tester should leads 10 and 11 accidentally be connected to the wrong battery terminals.

As indicated in FIG. 4, the ripple voltage present at the positive terminal of the battery enters amplifier 15 of ripple detector 14 via resistor 30 and capacitor 31, which capacitor isolates the DC component of alternator output from the ripple detector. The combination of resistor 30 and capacitor 31, together with the input impedance of the first amplifier stage, form a filter which acts to reject automobile ignition noise which may be present at input lead 10. The ripple isolated by capacitor 31 is amplified by a first stage of amplification comprising transistor 38, resistors 32, 33, 34 and 35, and capacitor 36.

The output of the first stage of amplification is coupled to a second stage of amplification via the network comprising resistor 40, capacitor 41 and diode 42, diode 42 providing a reverse charge path for capacitor 41. Transistors 44, 46 and 48, and resistors 45 and 47 comprise the second stage of amplification. In an alternate embodiment not shown in FIG. 4, a Darlington-type circuit also may be employed as the second stage of amplification.

At the output of transistor 48, the amplified normal ripple voltage is of sufficient amplitude to cause lamp 50 (which together with resistor 51 comprises alternator/diode performance indicator 16) to go ON, indicating that both the alternator and voltage regulator are operating normally. In a tester for a 12-volt electrical system, lamp 50 preferably is of the 6-volt variety; in conjunction with series resistor 51, this prevents the normal surge of current associated with tungsten bulbs from damaging transistor 48.

The characteristics of amplifier 15 may be altered using response control means 18 to cause the detector to be insensitive to the normal ripple waveform (see FIG. 1), but to be responsive to a ripple waveform indicative of a faulty diode (see FIG. 2). In the embodiment of the alternator tester shown in FIG. 4, response control means 18 comprises switch 52 and capacitor 54. When switch 52 (which may be of the pushbutton variety) is closed, capacitor 54 provides feedback for the first stage of amplification, thus causing the ripple detector to respond only to the waveforms associated with a faulty diode.

Under these conditions, lamp 50 of indicator 16 will be ON only if one or more of the alternator diodes are open or short circuited.

In the embodiment of the alternator tester shown in FIG. 4, gating circuitry 21 comprises transistor 60, resistors 57 and 63, diode 56, and capacitor 58. Gating circuitry 21 is energized via diode 56, resistor 57, and capacitor 58, which comprise a filter network which presents a DC signal to the base of emitter-follower transistor 60 when lamp 50 is not lit. Thus, (assuming that switch 52 is not closed) transistor 60 will be ON, and a voltage close to the supply voltage is available at its emitter, when a normal ripple voltage has not been detected by ripple detector 14. Under these circumstances, if a positive voltage appears at the field terminal of the alternator (i.e., at lead 19), lamp 66 of indicator 22 will be lit, since the voltage at the emitter of transistor 60 turns ON transistor 64 (in level sensing circuitry 20) via resistor 63. Series resistor 67 prevents current surges from damaging transistor 64 when lamp 66 goes ON. As noted earlier, indicator 22 signals the fact that the automobile alternator is not functioning properly.

If no voltage appears at the field terminal of the alternator, lamp 68 of indicator 24 will light, indicating that the automobile voltage regulator is not functioning properly. Note that the voltage at the emitter of transistor 60 (when lamp 50 is OFF) will turn ON emitter follower transistor 62, thus causing lamp 68 to light if no voltage is present at field connection 19, and if the field winding is not open circuited. Resistor 69 prevents current surges from damaging transistor 62 when lamp 68 goes ON.

Should the field winding of the alternator be open circuited, and should the automobile voltage regulator also be defective, no voltage will appear at the field terminal (connection 19), and the field terminal, rather than being ground potential, would be floating. Under these conditions, transistors 62 and 64 would both on ON, and current would be conducted in series through transistor 62, lamp 68, resistors 69 and 67, lamp 66, and transistor 64. Thus, both indicators 22 and 24 will be ON (although at about half of their full brilliance), indicating that both the alternator and the regulator are not functioning correctly.

Figure 5:
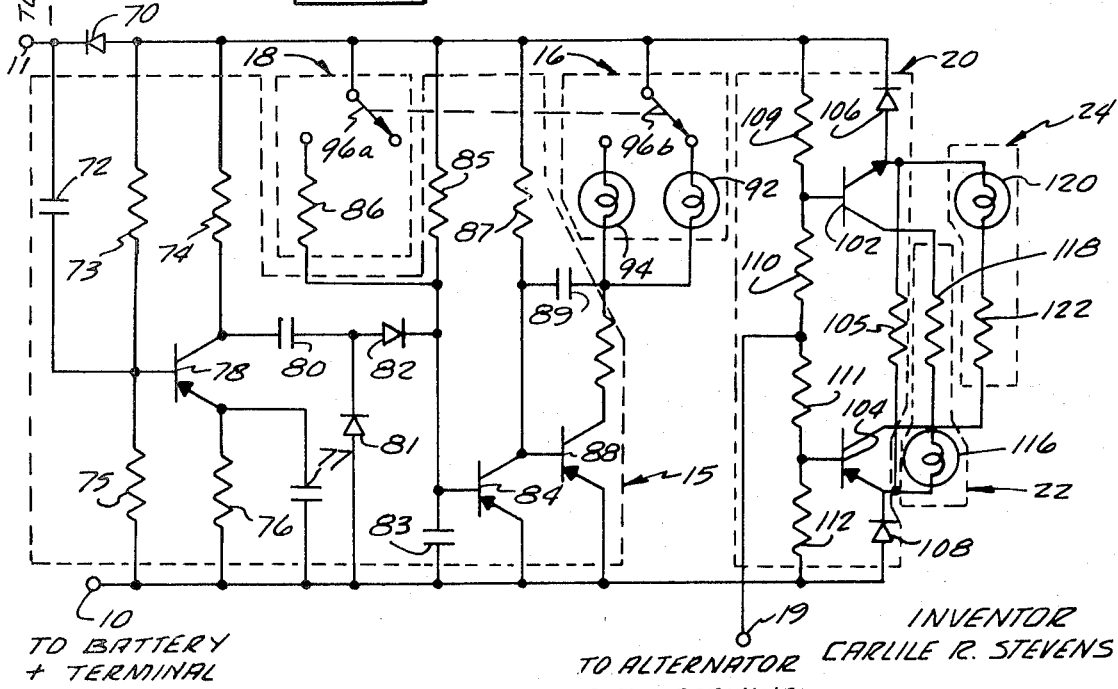
FIG. 5 is an electrical schematic diagram of another embodiment of the inventive automotive alternator and voltage regulator test apparatus, a block diagram of which is shown in FIG. 3.

A second embodiment of the inventive automotive alternator and voltage regulator test apparatus is shown in the schematic diagram of FIG. 5. As may be seen in FIG. 5, the tester again may be connected to the terminals of the automobile battery via leads 10 and 11. In this embodiment, the DC voltage thus obtained is used without additional filtering to power the various circuits of the tester. Diode 70 provides protection to the circuit components in case leads 10 and 11 accidentally should be attached to the wrong battery terminals.

The alternator ripple present at the battery terminals is isolated from the DC battery voltage by capacitor 72 and fed to a first stage of amplification comprising resistors 73, 74, 75 and 76, capacitor 77, and transistor 78. This first stage comprises a standard class A voltage amplifier. The amplified ripple appearing at the collector of transistor 78 passes through capacitor 80 and is converted to a DC signal by diodes 81 and 82. This DC signal, which charges capacitor 83, appears at the base of transistor 84.

Transistor 84 will switch ON when the amplitude of the output from the first stage of amplification (comprising transistor 78 and its associated components) is sufficiently large as to overcome the voltage drop across resistor 85. In a preferred embodiment, the values of the first stage amplifier components are selected (in a manner well known to those skilled in the art) so that transistor 84 will go ON when a normal ripple voltage is detected at the terminals of the automobile battery, but will remain OFF when a ripple waveform associated with a faulty alternator diode is detected.

The output of the first stage of amplification further is processed by a second stage of amplification comprising transistors 84 and 88, resistors 87 and 90, and capacitor 89. Capacitor 89 is included in the circuit to prevent oscillation. The output of transistor 88 is used to drive lamp 92 in indicator 16. Lamp 92 thus goes ON in response to the presence at the battery terminals of a normal ripple voltage, indicating that both the alternator and voltage regulator are functioning normally.

The response characteristics of amplifier 15 in the embodiment shown in FIG. 5 may be altered by closing switch 96a in response control means 18. This places resistor 86 in parallel with resistor 85, and has the effect of increasing the ripple voltage level required to cause an output sufficient to cause indicator 16 to go ON. Such an increased ripple voltage level only is present when one or more of the diodes in the alternator under test is faulty. In the embodiment of FIG. 5, switch 96b, which is ganged to switch 96a, connects lamp 94 in indicator 16 to the output of the ripple detector instead of lamp 92 when response control means 18 is activated. Thus, separate lamps are provided to indicate respectively normal operation of both alternator and voltage regulator, and the existence of one or more faulty diodes in the alternator.

Should it be determined that the alternator and regulator both are not functioning normally, the operator may connect lead 19 to the field winding of the alternator. This will provide an input to level-sensing circuitry 20. In the embodiment illustrated in FIG. 5, level sensing circuitry 20 comprises transistors 102 and 104, and resistors 109, 110, 111, and 112. Transistors 102 and 104 are biased OFF as a result of current flow through diodes 106 and 108 and resistor 105.

Should the alternator be faulty, but the voltage regulator be operating normally, when lead 19 is connected to the alternator field terminal, a positive voltage will appear at the junction 101 of resistors 110 and 111. This will increase the current through resistor 110, turning ON transistor 102. This in turn will produce an output to indicator 22, comprising lamp 116 and resistor 118. The lighting of lamp 116 thus indicates that the alternator is malfunctioning.

Should the alternator be operating normally, but the voltage regulator be defective, then when wire 19 is connected to the field terminal of the alternator, the junction 101 of resistors 110 and 111 will be placed at essentially the same potential as the battery negative terminal. (This results since the field winding normally is returned to the common ground of the automobile electrical system). As a result, the current through resistors 111 and 112 will increase, thus turning ON transistor 104. An output then will be provided to indicator 24, comprising lamp 120 and resistor 122, causing lamp 120 to go ON. The lighting of lamp 120 thus indicates that the voltage regulator is malfunctioning.

Should the voltage regulator be defective, and should the field winding be open circuited, the junction 101 of resistors 110 and 111 will remain floating when lead 19 is connected to the alternator field terminal. In this instance, neither lamp 118 nor lamp 120 will light. When this occurs, and when lamp 92 (in indicator 16) has remained OFF during the normal ripple test, it will be understood by the operator that both the alternator and the voltage regulator are malfunctioning.

Yet another embodiment of the inventive automotive electrical system test apparatus is shown in electrical schematic diagram form in FIG. 6. This embodiment includes high and low charging level sensors 23a and 23b (see FIG. 3) and associated indicators 25a and 25b to show whether the voltage regulator is correctly adjusted.

Referring to the electrical schematic diagram of FIG. 6, it may be seen that amplifier 15 comprises capacitors 130, 131, 132 and 133, resistors 134, 135, 136 and 137, diodes 138 and 139, and transistors 140, 141 and 142. Diode 138 functions to protect the test apparatus from damage should leads 10 and 11 inadvertently be connected to the wrong battery terminals. The AC ripple component of the alternator output is fed to the base of transistor 140 via capacitor 130; capacitor 130 of course prevents the DC component from appearing at the base of transistor 140. Transistor 140, in conjunction with collector load resistor 135, emitter resistor 136, and emitter bypass capacitor 131 functions to amplify the alternator ripple.

The bias level of transistor 140 is controlled by variable resistor 134, and preferably should be adjusted so that the voltage at the collector of transistor 140 is near ground. This will insure that the high-amplitude, negative-going, low-frequency ignition noise spikes (see, for example, the spikes designated 17 in FIG. 1) superimposed on the alternator output will be clipped and rejected. Capacitor 132 provides a feedback path for transistor 140 and allows the amplifier to reject high-frequency components of the ignition noise.

The output of transistor 140 is fed via capacitor 133 to the base of transistor 141, which together with transistor 142 and load resistor 137 forms a Darlington amplifier. Diode 139 provides a discharge path for voltage stored in capacitor 133.

In the test apparatus embodiment of FIG. 6, impulse response control means 18 comprises switch 145, capacitors 146 and 147, and resistor 148. Alternator diode and performance indicator 16 includes lamps 150 and 151.

When switch 145 is in the position shown in FIG. 6, amplifier 15 is sensitive to the normal alternator ripple illustrated in FIG. 1, detection of which will cause transistor 141 (in the Darlington amplifier) to conduct. Sufficient current then will flow in the path including resistor 137, lamp 150, the collector and emitter of transistor 141 and the base and emitter of transistor 142 so as to cause lamp 150 to go ON. Thus, the lighting of lamp 150 indicates that a normal ripple voltage is present and hence that the alternator under test is functioning properly.

Note that when switch 145 is in the position shown, bypass capacitor 147 acts to prevent amplified ripple from being coupled back to the input of transistor 140. Capacitor 147 also functions to insure that ripple detector 14 does not oscillate. Note also that since any AC ripple component present at junction 149 (between switch 145 and resistor 137) will be bypassed to system common by capacitor 147, resistor 148 and capacitor 146 do not function in the circuit during the normal alternator performance test.

To test for an open or short-circuited alternator diode, switch 145 (which may be of the momentary, pushbutton variety) is depressed, connecting junction 149 to lamp 151. Now, when a ripple signal is detected, a portion of the amplified ripple present at the collector of transistor 141 is fed back to the emitter of transistor 140 via lamp 150, resistor 148, and capacitor 146. This acts to reduce substantially the combined gain of transistor 140 and the Darlington amplifier, and as a result, sufficient current to light lamp 151 will flow in the collector circuit of transistor 142 only when a ripple voltage such as that shown in FIG. 2 is present at the battery terminals Thus, lamp 151 will indicate by going ON when switch 145 is depressed, that one or more alternator diodes are defective.

Lamps 153 and 154 are used respectively to indicate alternator malfunction and voltage regulator malfunction. These lamps operate in conjunction with level-sensing circuitry 20 comprising, in the embodiment of FIG. 6, diodes 155 and 156, and resistors 157 and 158.

The voltage divider consisting of resistors 157 and 158 provides at one end of lamps 153 and 154 a voltage corresponding to the rating of the lamps. The circuit through the lamps is completed by connecting lead 19 to the field terminal of the alternator under test. Should the automotive voltage regulator be functioning properly but the alternator be defective, the field terminal will be positive (with respect to the battery negative terminal), and current will flow through lamp 153 and diode 155. Thus, lamp 153 will go ON to indicate alternator malfunction.

If the alternator field terminal is of the same polarity as that of the negative battery terminal, current will flow in lamp 154 and diode 156. Thus, lamp 154 will go ON to indicate voltage regulator malfunction.

The test apparatus of FIG. 6 includes circuitry to facilitate determination of whether the voltage regulator under test is adjusted to charge the automotive battery to too high or too low a voltage. In particular, high charging level sensor 23a comprises resistors 170, 171, 172 and 173, and transistors 174 and 175. Similarly, low charging sensor 23b (see FIG. 3) comprises resistors 160, 161, 162 and 163, and transistors 164 and 165.

Referring still to FIG. 6, resistors 160 and 161 (in sensor 23b) form an adjustable voltage divider to supply bias to the base of transistor 164. When the correct charging voltage is present at the terminals of the battery under test (as connected to the test apparatus via leads 10 and 11), transistor 164 will conduct. Current will flow through the path including resistor 162 and the collector and emitter of transistor 164, causing the voltage at the base of transistor 165 to drop sufficiently low so as to cut off transistor 165. Since no current then will flow through transistor 165, lamp 166 will remain OFF.

Should the charging voltage at the terminals of the battery drop below a predetermined level set by adjustment of variable resistor 161, transistor 164 will cease conducting. The collector of transistor 164, and hence the base of transistor 165, then will rise approximately to the forward conductance voltage of transistor 165 and transistor 165 will conduct. Current then will flow through resistor 163 and lamp 166. Lamp 166 will go ON, indicating that the voltage regulator is set too low and that the battery is not being charged to a high enough value.

Lamp 176 turns ON to indicate that the voltage regulator is to charge the battery to too high a value. As shown in FIG. 6, this is accomplished in the following way. The voltage divider consisting of resistors 170 and 171 is adjusted so that transistor 174 will go ON when the voltage present at the terminals of the battery under test exceeds a predetermined value determined by the setting of resistor 171.

When transistor 174 begins to conduct, current flows through resistor 172, driving the base of transistor 175 to a potential approximately equal to that at its collector. Since transistor 175 is of the PNP variety, it too will go into conduction, causing current to flow through resistor 173 and lamp 176 to go ON. Of course, should the normal charging voltage be present at the battery terminals, the voltage appearing at the base of transistor 174 will be insufficient to cause transistor 174 to conduct. In this case transistor 175 will also be nonconducting and lamp 175 will remain OFF.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A device for testing an alternator having a field terminal and a voltage regulator as interconnected with a battery in an operating vehicle electrical system, said device comprising:
   ripple detector means detachably connected across said vehicle electrical system for detecting the presence of a ripple voltage at the terminals of said battery superimposed on the voltage of said battery and for providing an output in response to said detected ripple voltage;
   response control means for causing said ripple detector means only to provide an output upon detection of a ripple voltage indicative of a defective alternator diode; and
   level-sensing means operable in response to defective indication on said output from said ripple detector means for sensing the voltage level present at the field terminal of said alternator.

2. A device as defined in claim 1 wherein said response control means comprises:
   means for reducing the gain of said amplifier.

3. A device as defined in claim 1 wherein said response control means comprises:
   means for introducing feedback in said amplifier.

4. A device as defined in claim 1 including
   level-sensing means operable in response to defective output from said ripple detector means;

first and second indicators;

first means for operating said first indicator when the voltage at said field terminal is at a potential different from that at one terminal of said battery; and second means for operating said second indicator when the voltage at said field terminal is at the same level as at said one terminal.

5. A device for testing an alternator having a field terminal and a voltage regulator as interconnected with a battery in an operating vehicle electrical system, said device comprising:

ripple detector means detachably connected across said vehicle electrical system for detecting the presence of a ripple voltage at the terminals of said battery superimposed on the voltage of said battery and for providing an output in response to said detected ripple voltage;

said ripple detector means comprises:

an amplifier having a capacitor coupled input;

means for connecting said input to the terminals of said battery;

indicator means cooperating with said amplifier for indicating that a ripple voltage is being amplified;

response control means for causing said ripple detector means only to provide an output upon detection of a ripple voltage indicative of a defective alternator diode;

level-sensing means operable in response to defective output from said ripple detector means comprising:

first and second indicators;

first means for operating said first indicator when the voltage at said field terminal is at a potential different from that at one terminal of said battery; and second means for operating said second indicator when the voltage at said field terminal is at the same level as at said one terminal.

6. A device as defined in claim 5 wherein said first and second indicators comprise first and second lamps.

7. A device as defined in claim 6 wherein said first means comprises means for causing current to flow between said field terminal and said one terminal via said first lamp, and wherein said second means comprises means for causing current to flow between said field terminal and the other terminal of said battery via said second lamp.

8. A device as defined in claim 5 further comprising:

gate means for energizing said first and second means only when no output is being provided by said ripple detector means.

9. A device as defined in claim 5 further comprising:

means for sensing that the voltage across the terminals of said battery is less than a first predetermined value or greater than a second predetermined value.

10. An apparatus for testing an alternator and a voltage regulator as interconnected with a battery in a vehicle electrical system, said device comprising:

an amplifier having an input and an output;

means for capacitively coupling said input to the terminals of said battery whereby a ripple voltage present at said terminals will be amplified by said amplifier;

indicator means, connected to said output, comprising first and second lamps and means for turning ON said first lamp in response to an amplified ripple voltage from said amplifier;

means for introducing feedback in said amplifier to reduce its gain, whereby only said second lamp will be turned ON when a ripple voltage indicative of a defective alternator diode is amplified;

a voltage divider comprising first and second series connected resistors connectable between said battery terminals;

third and fourth lamps, each having one end connected to the junction of said first and second resistors; and first and second diodes, the anode of said first diode and the cathode of said second diode being connected together and being connectable to the field terminal of said alternator, the cathode of said first diode being connected to the other end of said third lamp, and the anode of said second diode being connected to the other end of said fourth lamp.

11. A device as defined in claim 7 further comprising:

second and third voltage dividers connectable across said battery terminals;

a fifth lamp, and means for turning ON said fifth lamp when the voltage at the junction of said second voltage divider is less than a first predetermined value; and a sixth lamp, and means for turning ON said sixth lamp when the voltage at the junction of said second voltage divider is greater than a second predetermined value.

* * * * *